J. L. BOGERT.
CRANK AXLE LATHE.
APPLICATION FILED SEPT. 9, 1904.
920,420.
Patented May 4, 1909.
5 SHEETS—SHEET 1.
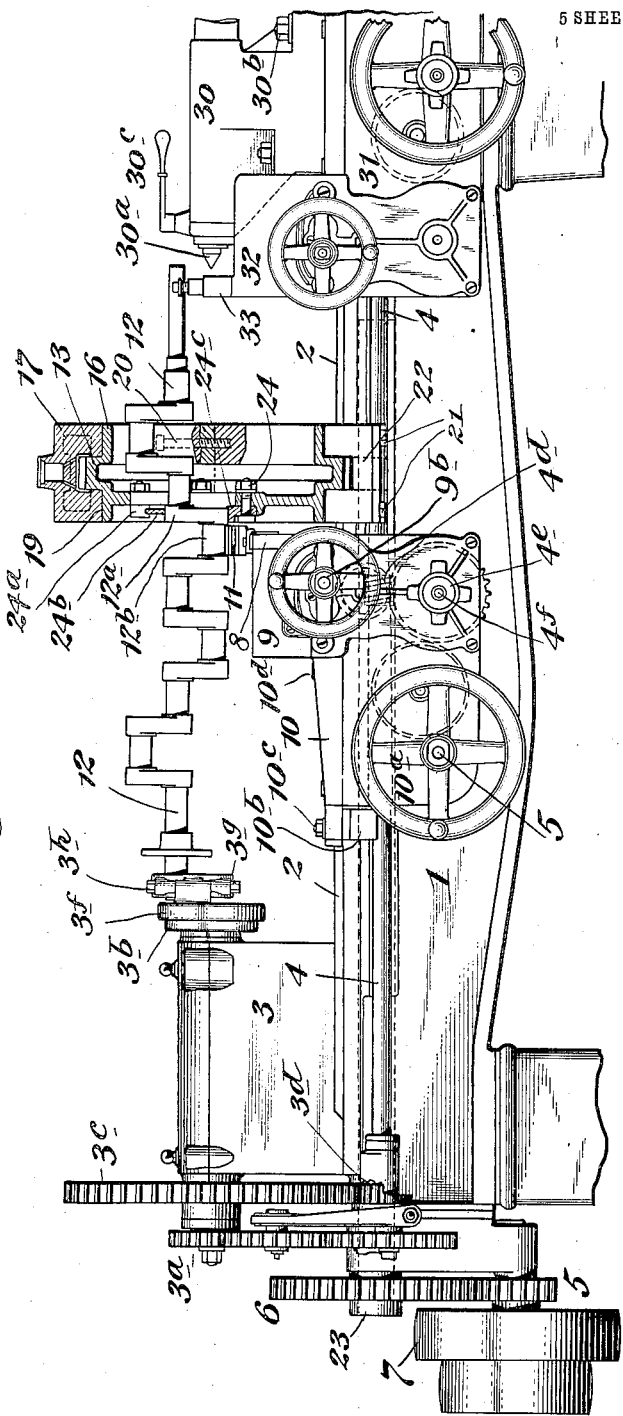

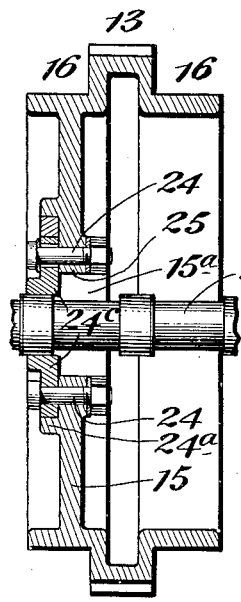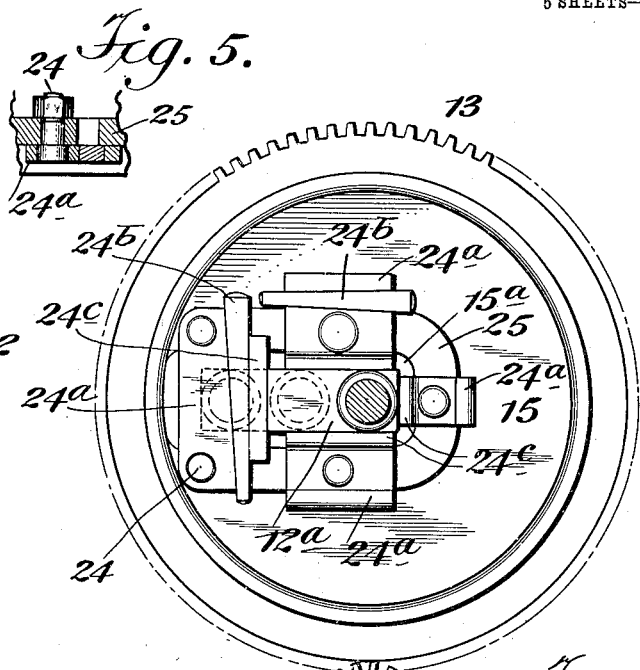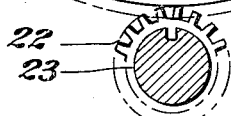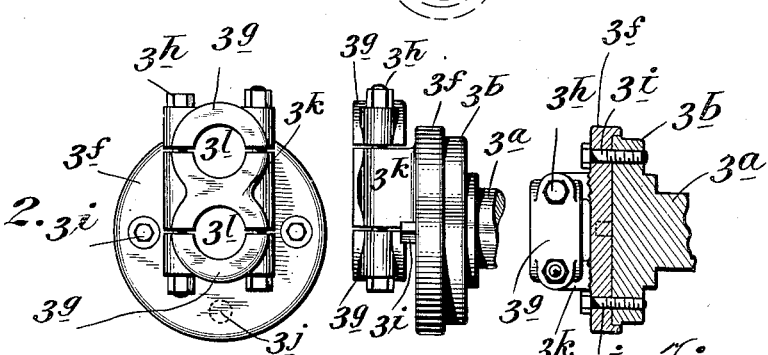

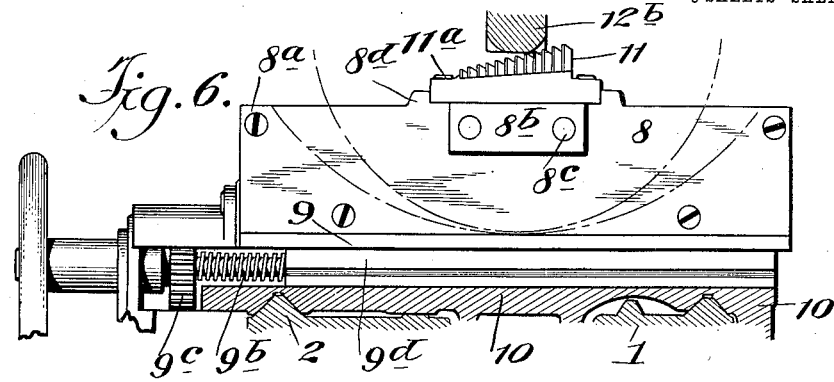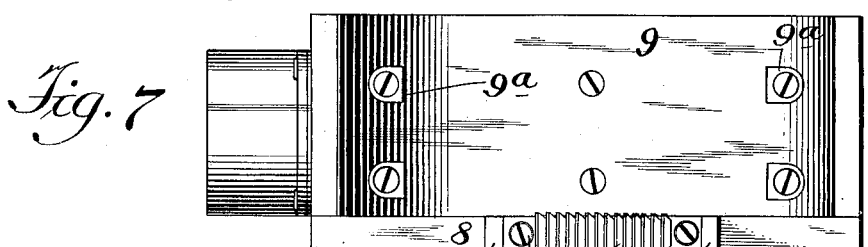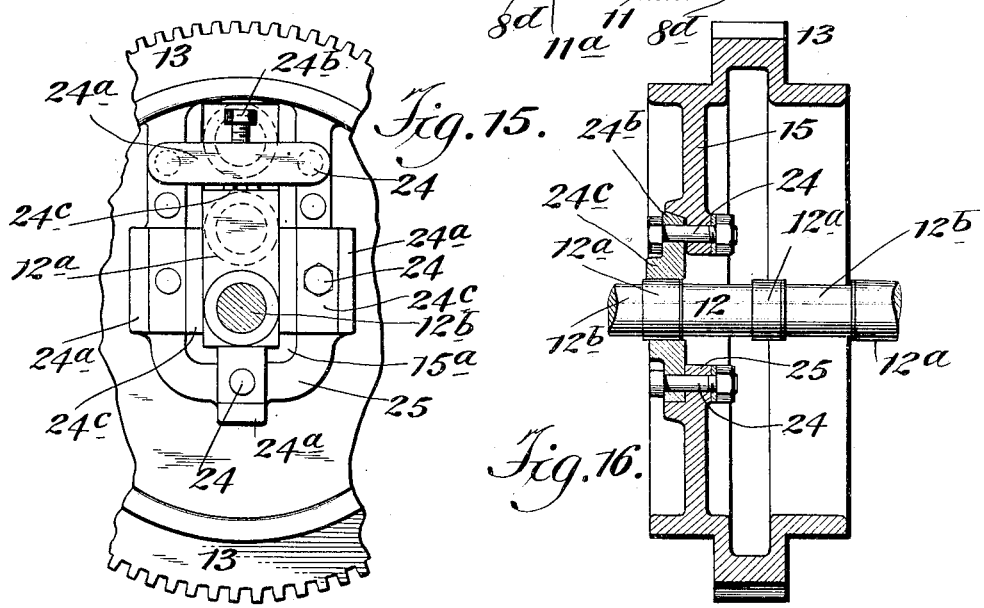

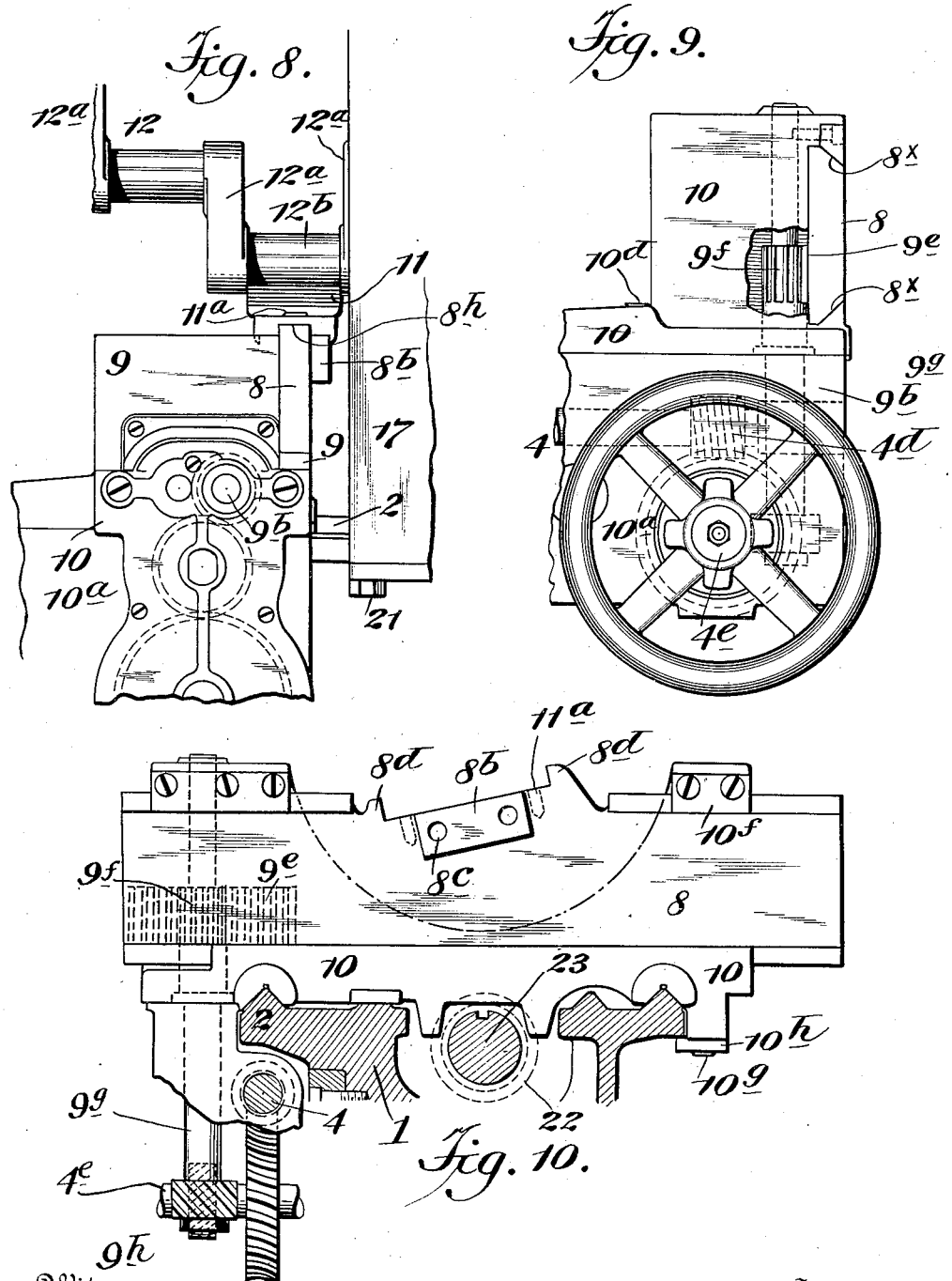

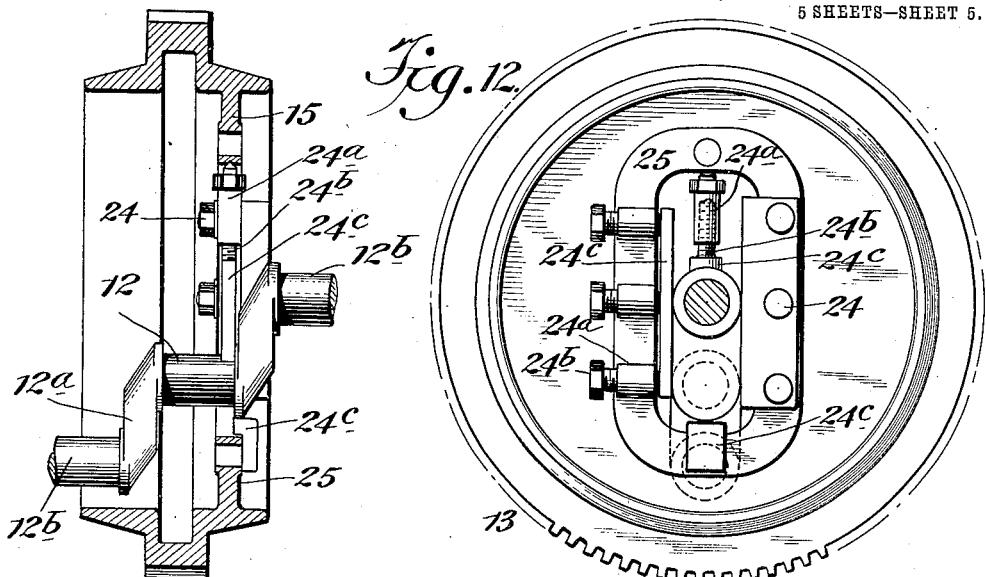

UNITED STATES PATENT OFFICE.

JOHN L. BOGERT, OF NEW YORK, N. Y.

CRANK-AXLE LATHE.

No. 920,420.            Specification of Letters Patent.            Patented May 4, 1909.

Application filed September 9, 1904. Serial No. 223,903.

*To all whom it may concern:*

Be it known that I, JOHN L. BOGERT, a citizen of the United States, and residing in New York city, borough of Queens, New York, have invented certain new and useful Improvements in Crank-Axle Lathes, of which the following is a specification.

My invention relates to improvements in crank axle lathes of the class shown in U. S. Letters Patent No. 568,063, granted to me September 22, 1896, and in the lathe I have illustrated in the accompanying drawings provision is made for operating upon multiple-pin crank shafts, such as used in gas engines.

One of the objects of my invention is to provide such a lathe or machine wherein the cylindrical bearing surfaces of a crank axle, including the crank pin or pins, can be economically turned or cut to their proper dimensions.

Another object of the invention is to provide means for permitting rapid and accurate chucking of the crank axle, whereby its point of application of rotational strain and transverse support may always be close to the thrust of the cutting tool or mill.

A further object of the invention is to provide a novel tool support, so arranged that the tool can be brought close to the crank pin or bearing while rigidly held.

The invention consists in a lathe having a head-stock whose spindle carries a chuck arranged to firmly grasp the end of the crank axle so that either the main bearing portions of the axle or the crank pins thereof may be accurately centered for turning or cutting, and a rotating wheel mounted in a bearing frame or case that is adjustable along the bed of the machine toward and from the head-stock and which carries a chuck to firmly grasp the arm of a crank, said chuck and the head-stock chuck being geared together for rotation in absolute simultaneousness. By thus having the angular velocity of the spindle chuck and the rotating-wheel chuck always the same, a true cylindrical surface will be produced by a cutting edge parallel to the axis of rotation. In the case of turning the crank pin or pins, it is only necessary that both of said chucks shall be eccentric the amount of the throw of the crank, and both chucks are therefore so constructed that they may firmly hold the crank shaft in two positions—either the axis of the shaft itself or the axis of the crank pin coinciding with the axis of rotation of the lathe spindle.

The invention further consists in a tool support comprising a sheet of metal made narrow or thin enough to pass between the arms of a crank, extended sufficiently in length and breadth to secure suitable support against buckling strains, and adapted to carry the mill or tool on the edge that passes nearest to the axis of rotation of the axle or a crank pin.

The invention further consists in the novel construction of chucks, one adapted for the end of a head-stock spindle to grasp the crank shaft proper both concentrically and eccentrically of the main spindle according as a shaft bearing or a crank pin is to be operated upon, and the other for said rotating wheel adapted to grasp an arm of a crank so that a shaft bearing or crank pin axis may be concentric with the axis of rotation of the main spindle at the will of the operator.

The invention further comprises the novel details of improvement that will be more fully hereinafter set forth and then pointed out in the claims.

Reference is to be had to the accompanying drawings forming part hereof, wherein, Figure 1 is a side elevation of a crank axle lathe embodying my improvements, showing the parts in position for milling one of the crank pins of a four throw crank shaft, Fig. 2 is a detail view looking at the front of the main spindle chuck, Fig. 2ª is an edge view thereof, Fig. 2ᵇ is a sectional detail thereof, Fig. 3 is a detail face view of a rotating wheel and its chuck for grasping a crank arm, Fig. 4 is a central section thereof, Fig. 5 is a detail section through the bolt, Fig. 6 is a detail cross section through the main bed, showing a cross slide and milling tool, Fig. 7 is a plan view thereof, Fig. 8 is a detail face view of part of the tool carriage, Fig. 9 is a substantially similar view showing a modification, Fig. 10 is a cross section through the main bed, at right angles to Fig. 9, Fig. 11 is a detail view showing a modification of the arrangements of the milling tool and its support, Fig. 12 is a detail face view of the main rotative wheel, showing a modification of the chuck, Fig. 13 is a vertical section thereof, Fig. 14 is a horizontal section of Fig. 12, Fig. 15 is a detail view of the main rotative wheel illustrating a further modification of its chuck, Fig. 16 is a sectional view thereof, and Fig. 17 is a section showing means for holding the rotative wheel guide or frame upon the main bed.

Similar numerals of reference indicate corresponding parts in the several views.

In the drawings the numeral 1 indicates the bed of the machine, 2 are the ways of which there may be four, 3 is the head-stock, 17 a frame or guide for the rotating wheel 13, and 10 is a tool supporting carriage, the head-stock 3, frame 17 and carriage 10 all being mounted upon and fitted to the ways 2 to travel along the same in usual or well known manner.

At 23 (see Fig. 10) is a main driving shaft which passes along within the bed 1 and is suitably supported, to which motion may be imparted through the pulley 7 and gears 5, 6. The shaft 23, by means of suitable keys or feathers, drives the pinion $3^d$ which may be journaled in a suitable bearing under the head-stock 3, and said shaft also drives a pinion 22 which meshes with the peripheral teeth of wheel 13, which pinion revolves in the lower part of case or frame 17. The head-stock 3 remains fixed in position on bed 1 and the frame 17 with its contained wheel 13 can be shifted along said bed, the distance between the head-stock and the frame 17 being varied according to the length of the crank shaft operated upon.

The head-stock live-spindle $3^a$ has a gear $3^c$ engaging the pinion $3^d$ on the main shaft 22, and it is of vital importance that the gear $3^c$ and rotating wheel 13 should have the same pitch line diameter, the pinions $3^d$ and 22 likewise having the same pitch line diameter; it is also advisable that they should respectively have the same number of teeth. By providing pinions $3^d$ and 22 with the same pitch line diameter and gears $3^c$ and 13 then having also the same pitch line diameter, they being driven by the same main driving shaft 23, the angular velocity of wheel 13 and live-spindle $3^a$ will always be the same.

The chuck provided for live spindle $3^a$ for grasping one end of the crank shaft is arranged as follows:—Said spindle has a flange or head $3^b$ at its inner end and to this head is removably secured the chuck $3^f$ which is recessed to fit accurately over the head $3^b$ to prevent side movement, and said head and chuck are removably secured together by bolts $3^i$ and dowel pins $3^j$ (see Figs. 2, $2^a$ and $2^b$.) The chuck $3^f$ has a lug or projection $3^k$ and on opposite sides thereof are caps or binders $3^g$, which are bolted to the lug $3^k$ by the bolts $3^h$ and between the lug $3^k$ and the binders $3^g$ clamping sockets $3^l$ are bored or formed to the desired sizes to fit a crank shaft, one of said sockets being concentric with live-spindle $3^a$, and the other socket eccentric to the exact amount of the crank throw or to correspond with the axis of the crank pin of the shaft 12. From this it will be observed that with the chuck secured to the head $3^b$ of the live-spindle in the proper position and a crank shaft inserted in the eccentric socket, by loosening the bolts $3^h$ the shaft may be turned on its axis until any particular crank pin is brought into alinement with the axis of rotation of the spindle $3^a$. Likewise, when the main bearing portion of the shaft are to be turned or cut the end of the crank shaft will be placed in the socket $3^l$ that is concentric with the live-spindle 3. When any part of the crank shaft is to be turned or cut, one of its crank arms will be grasped by the chucking devices carried by rotating wheel 13, and by clamping an arm $12^a$ of the crank shaft contiguous to the crank pin $12^b$ that is to be turned the rotational and transverse strains due to the cutting are taken up by the chucking devices while the chuck $3^f$ steadies the crank shaft 12 and insures accuracy of rotation.

The means of clamping the frame or case 17 in any desired position along the bed 1 whereby the frame 17 is kept from distortion when clamped is a novel part of this invention as illustrated herein, although the arrangement of frame for supporting and guiding wheel 13 may be used as in my said Patent No. 568,063, if desired. In the present case the frame 17 is made in halves fastened together by screws 20 (see Fig. 1) whereby the wheel 13 can be inserted and removed from said frame. The bearing surfaces 19 of frame 17 support the journals or bearing surfaces 16 of wheel 13, and the main shaft 23 is journaled in the bearings 26 of frame 17 which are made in two parts or halves and bound together by screws 27. The upper part of bearing 26 is made integral with frame 17 and the lower part $26^a$ is so constructed that it not only supports the main driving shaft 23 but also acts as a clamp to hold down the frame 17 upon the inner ways 2 of bed 1, as the outer edges $26^b$ bear under the edges $2^a$ of bed 1. This feature is important, as when the outer clamping screws 21 are tightened the tendency is to distort the frame 17 by springing it up in the middle, but this tendency is effectually resisted by the screws 27 holding the lower extending bearing portions $26^b$ against the under side $2^a$ of the table or shelf of bed 1. (See Fig. 17.) 28, 29 are metal guards to retain the oil or grease used on the gearing and to exclude dirt. By loosening the screws 21 and 27, frame 17 may be adjusted along the bed so that the chuck of wheel 13 may grasp a crank arm $12^a$ of any crank of the axle 12.

The arrangements I have shown for grasping a crank arm $12^a$ whereby wheel 13 may rotate the axle 12 are as follows:—The web or plate 15 of wheel 13 is provided with a slot or opening $15^a$ through which the axle 12 and its crank arms can pass and within which the crank arms can lie (see Fig. 3.) Said slot or opening is elongated and extends outwardly across the center of web 15 up to the rims or flanges 16, and said slot or opening is also shown substantially rectangular in form to correspond with the transverse outline of the crank arms $12^a$. To firmly chuck or grasp crank arm $12^a$ in the proper position for tool-finishing either its pin $12^b$ or its contiguous bearing portion, I provide four chucking jaws $24^c$, two of which may be fixed while operating on any axle and their two opposing jaws should be adjustable. The plate or web 15 is somewhat thickened around the opening $15^a$ to form a strengthening strip at 25, and abutments $24^a$ are provided to take the chucking strains. By means of the wedges $24^b$ the two adjustable chucking jaws $24^c$ are forced against the crank arm $12^a$ binding it to the opposed fixed chucking jaws. The bolts 24 permit the removal of the adjustable abutments $24^a$ when passing the crank shaft 12 through the slot $15^a$ before or after the turning of a crank or bearing surface.

The principle of employing two fixed chucking jaws and two opposing adjustable jaws being preserved, the details of construction may be varied, such as shown in Figs. 12, 13, 14, 15 and 16. The chucking wedges $24^b$ may be incorporated as in Fig. 12 with the chucking jaws $24^c$, and adjusted by tightening the bolts 24, or their equivalents may take the form of a binding screw carrying a washer at its end. In this latter case the washer is indicated at $24^e$, $24^b$ being the screw and $24^a$ the nut; as a screw is a wedge wrapped around a cylinder, any form of wedge may be modified to tighten the two adjustable jaws.

With the form of chucking devices for gripping the crank arms above set forth, it will be understood that to make use thereof to the best advantage it is important that the crank arms $12^a$ should all be planed on centers before the crank shaft 12 is introduced into the lathe for the purpose of milling its pins and bearing surfaces. If the planing is properly done and the crank arms $12^a$ are all exactly in line on their edges no time need be lost in clamping the crank arms against the fixed chucking jaws $24^c$, but if the edges of the crank arms $12^a$ are unplaned or differ from one another in their symmetrical distances from the axis of the shaft and of the crank pins, it will be necessary to adjust the fixed jaws as well as the adjustable ones every time the position of the crank shaft 12 is altered in the lathe. The axis of rotation of the wheel 13 is the axis of any bearing surface or crank pin of the crank shaft turned or milled, and such axis is at constant distances from the two fixed chucking jaws $24^c$; hence the advantage of planing the opposite sides of all crank arms $12^a$ to an equal distance from the axis of the bearing-surface and of the crank pin. In the form of crank arms shown in Fig. 12, however, which are not rectangular in outline, the adjustable jaw $24^c$ is shown bearing against the part 12 of the axle while one of the pins $12^b$ is in line with the axis of rotation of wheel 13; and correspondingly when the part 12 is to be turned the adjustable jaw $24^c$ will correspondingly grip a pin $12^b$.

A crank shaft 12 having been properly chucked by the respective chucking devices of the rotating wheel 13 and the head-stock spindle $3^a$, cutting tool 11, which is supported by the relatively thin plate 8 that is secured to the cross slide 9 of carriage 10, is fed across, under and against the surface to be operated upon. The tool 11 I have shown is of substantially rectangular outline on its cutting faces, and the front cutting face of the tool is presented to the part to be cut at an acute angle to the line of feed under the work or at a tangent with respect to the axis of such part, and said tool is provided with a plurality of cutting or milling edges. In the arrangement shown the cutting tool has at least one cutting edge at a distance below the axis of rotation of the part to be cut equal to the proper radius of the surface when turned, and therefore it is only necessary to feed the tool once across under the work to turn it to the proper diameter. The cutting edges of the sides of the tool engage the opposed faces of the crank arms $12^a$ and cut the same simultaneously with the cutting of the pin $12^b$ by the inclined cutting edges, and therefore the tool at a single passage across beneath the work cuts the pin or bearing surface to the proper width and diameter and also faces off the crank arms.

The cross slide 9, carrying the tool support or plate 8 and the tool 11, travels in a suitable guide formed on the upper side of the carriage 10, and suitable or well known gearing contained in the apron $10^a$ permits of the rapid adjustment of the carriage 10 along the ways 2 of bed 1 to the desired position where it is temporarily clamped by the bolt $10^c$ acting on the binder $10^b$ which grasps the edge of the bed 1 (see Fig. 1). The splined feed rod 4, located along the front of bed 1, is driven from the end of the head-stock spindle $3^a$ by means of ordinary lathe feed gearing (see Fig. 1) and passes through the apron $10^a$, and said shaft by means of a suitable sliding key or feather drives the worm $4^d$. The worm $4^d$ through a worm wheel on the cross feed shaft $4^f$ and suitable connecting gearing through a gear $9^c$ drives a cross feed screw $9^b$ journaled on the carriage 10 and engaging a nut $9^d$ on cross slide 9 to actuate the latter (see Fig. 6). Such details may be similar to those shown in U. S. Patent No. 444,544, granted to me Jan. 13, 1891, and the carriage 10 may be adjusted along the bed on ways 2 by means of a screw or rack and pinion as shown in my said patent No. 568,063. By means of the hand wheel 4$^e$, in manner well known in the art, a pair of frictions are tightened or loosened to cause the cross feed to start or stop.

The tool supporting plate 8 is shown secured upon the cross slide 9 by screws 8$^a$, and said plate carries on its upper edge between the shoulders or lugs 8$^d$ the mill 11; said mill is secured to plate 8 by screws 11$^a$ which pass through holes located between the sides of the mill, and said mill is prevented from side movement upon plate 8 by a groove 8$^h$ planed on its under side, which overlaps the plate 8, (see Fig. 8). Where the width of the mill 11 permits it, this groove is made at least as wide as the thickness of plate 8, and where a very wide mill is used the groove is made wide enough to over-lap the supporting plates 8$^b$ which are sustained on plate 8 by pins 8$^c$ or made integral with plate 8. In the latter case the cross slide 9 may be equipped with two plates 8, one for narrow mills and one for wide mills, the screws 8$^a$ permitting of a rapid interchange of plates. As the mill wears it may be packed up toward the axis of rotation of the work by packing pieces or shims, so that the diameter of the work when the last cutting edge has been fed along under it may be of desired size. The number of cutting edges and amount of stock to be removed by each cutting edge may be varied to suit the nature of the work. To cheapen the construction of the mill or cutting tool I prefer to construct the surface of the upper edge of plate 8 at such an angle to the direction of the feed movement of the cross slide 9 that the mill may be of uniform thickness instead of wedge shape placed on a horizontal surface of plate 8, (see Figs. 10 and 11). Where the widths of the different bearing surfaces of the crank axle and the widths of the crank pins are not all alike, it will be necessary to use a mill no wider than the narrowest bearing; a wide surface may then be milled by making one cut, then moving the carriage 10 along the bed 1 and making another pass of the mill under the work.

The cross slide 9 is made with concave upwardly extending portions, the length and curvature being such that at the extremities of the travel of the mill, the full swing of the axle is not interfered with. By this construction, the tool supporting plate 8 is rigidly held against buckling strains and its lower edge rests for its whole length sustained by the cross-slide and carriage.

An important modification in the construction of the tool supporting plate 8 is shown in Fig. 9 where said plate is constructed with dove-tail bearing surfaces 8$^\times$ sliding in corresponding guides formed in the upwardly extending horns or portions of carriage 10, and thereby the cross slide 9 is in reality merged in the tool supporting plate 8 (see Figs. 9 and 10.) In said figures a rack 9$^e$ on plate 8 engages with a pinion 9$^f$ forming part of a vertical shaft 9$^g$ which is rotated by a spiral gearing 9$^h$ in the apron 10$^a$ driven from shaft 4 by suitable gearing, this feeding mechanism corresponding essentially to the parts 9$^b$, 9$^c$, 9$^d$, and 9$^e$ in Fig. 6, for operating the cross slide 9. The feeding of plate 8 is started or stopped by a pair of frictions operated by hand wheel 4$^e$ on shaft 4$^f$ in manner before explained.

Referring to Fig. 1, a foot block 30, carrying the spindle 30$^a$ alined with the head-stock spindle 3$^a$, adapted to be projected by means of a screw and clamped in position by a binder handle 30$^c$ in well known manner, may be mounted upon the ways 2 of bed 1 and secured in its proper position by the usual bolts 30$^b$, and the prolongation of shaft 12 may be turned at the same time its bearings are being milled. By securing suitable centers to the head-stock spindle 3$^a$ and foot block spindle 30$^a$ work may be turned on centers as in an ordinary lathe. A second carriage 31 with its cross slide 32 and tool post 33 is fed along the bed on the ways 2 by means of suitable gearing operated by a worm carried by splined feed rod 4 produced for that purpose. By means of this construction a tool carried by the post 33 may be caused to operate on the bearing portion of shaft 12 simultaneously with the turning of other bearing portions of said shaft. The details for operating the foot block 30 and cross slide 32 being well known in the art, I have not further illustrated them as I do not limit my invention to any particular construction of carriage, apron or foot block, nor to the particular construction of head-stock, gear-case, feed-gearing or driving-gearing set forth, but for a more full description of such parts I refer to my U. S. Patent No. 568,063, before mentioned.

From what has been explained it will be understood that where a multiple-throw crank-shaft is to be turned, the end of the shaft is centered in the eccentric socket 3$^i$ of the head-stock chuck and one of the crank arms is secured to the rotative wheel 13, and in a four throw crank axle, as shown in Fig. 1, two of its crank pins 12$^b$ will be centered at one time, whereby after tool 11 has been passed under a crank pin for turning it, frame 17 will be shifted along the axle to grip the crank arm of the next corresponding pin, and then when that pin has been turned it will only be necessary to reverse the positions of the four pins with respect to the axis of spindle 3$^a$ and to clamp the corresponding crank arms and operate tool 11, as before explained. Then, when the main bearing portions of the shaft are to be turned, the main part at one end of the shaft is placed in the concentric socket 3$^1$ of the head-stock chuck, and tool 11 may be passed under the bearing portions of the shaft, the tool 11 in all cases making a complete cut of the size or diameter desired by one passage under the work, simultaneously facing off the inner faces of the adjacent crank arms. By the arrangement shown much time and labor are saved in turning multiple-throw crank axles by reason of the fact that for a single adjustment of shaft 12 with respect to the head-stock chuck a number of cuts can be made by tool 11, and furthermore the gripping devices of wheel 13 can be readily adjusted and fastened to the crank arm close to the pin or bearing to be cut or turned, whereby rigidity of support of the crank axle at the point of performing the work is readily effected.

Having now described my invention what I claim is:

1. In a lathe, the combination of a rotative wheel, a guide for said wheel, means for rotating said wheel, said wheel being provided with an opening, fixed jaws adjacent to said opening and located at a right angle to each other, two adjustable jaws respectively opposed to the fixed jaws, and wedges to co-act with the adjustable jaws whereby the crank arms of a crank axle may be supported and rotated by said wheel, substantially as described.

2. In a crank axle lathe, a chuck comprising a member provided with semi-circular faces, and caps having semi-circular faces forming sockets, with means for securing said caps upon the end of a crank shaft, one of the sockets being concentric with the axis of said member and the other socket eccentric to said axis, substantially as described.

3. In a crank axle lathe, a chuck member provided with a lug and adjustable caps, with means for securing said caps to said lug, said chuck having a socket between the lug and a cap that is concentric with the axis of the chuck and also having a socket between the lug and a cap that is eccentric to the axis of said chuck, substantially as described.

4. In a lathe chuck, a head, a chuck member removably secured to said head and provided with two clamping sockets for a crank axle, one of which sockets is concentric with the axis of the chuck, and the other of which is eccentric thereto, substantially as described.

5. In a lathe, the combination of a spindle provided with a head, of a chuck member provided with a recess on one face to receive said head, means for detachably securing said member and head together, said member having a clamping socket that is concentric to the axis of the spindle and another clamping socket that is eccentric to the axis of the spindle, substantially as described.

6. In a lathe, the combination of means for supporting and rotating a crank axle, with a carriage provided with a support for a tool movable transversely of the lathe bed, a tool mounted on said support and wider than the latter and provided with a plurality of cutting edges, and means located within the planes of the sides of the tool for securing the tool upon its support, substantially as described.

7. In a lathe, the combination of means for supporting and rotating a crank axle, with a carriage provided with a support for a tool movable transversely of the lathe bed, and a tool mounted on said support and wider than the latter and provided with a plurality of cutting edges on one face located on a plane parallel to the axis of the work, and also having cutting edges on opposite sides, and means located within the planes of the sides of the tool for securing the tool upon said support, substantially as described.

8. In a lathe, the combination of means for supporting and rotating a crank axle, with a carriage provided with a support for a tool movable transversely of the lathe bed, and a tool provided with a groove on its under side mounted upon said support so that the extensions of the tool over-lap the edges of the support, said tool being provided with cutting edges located on a plane parallel to the axis of rotation of the work and oblique to the plane of movement of the support, substantially as described.

9. In a lathe, the combination of means for supporting and rotating a crank axle, with a carriage provided with a support for a tool movable transversely of the lathe bed, and a tool provided with a groove on its under side mounted upon said support so that the extensions of the tool over-lap the edges of the support, said tool being provided with cutting edges located on a plane parallel to the axis of rotation of the work and oblique to the plane of movement of the support, and means located between the sides of the tool for securing the tool upon its support, substantially as described.

JOHN L. BOGERT.

Witnesses:
T. F. BOURNE,
M. HOLLINGSHEAD.